United States Patent
Mitchell et al.

(10) Patent No.: US 8,806,803 B1
(45) Date of Patent: Aug. 19, 2014

(54) COMBINATION BAIT BUCKET AND TACKLE BOX

(76) Inventors: Michael S. Mitchell, Mobile, AL (US);
Denny A. Blackhard, Spanish Fork, AL (US)

(*) Notice: Subject to any disclaimer, the term of this patent is extended or adjusted under 35 U.S.C. 154(b) by 297 days.

(21) Appl. No.: 13/235,081

(22) Filed: Sep. 16, 2011

Related U.S. Application Data

(60) Provisional application No. 61/383,422, filed on Sep. 16, 2010.

(51) Int. Cl.
*A01K 97/06* (2006.01)
*A01K 97/05* (2006.01)

(52) U.S. Cl.
USPC ............... 43/54.1; 43/56; 43/57; 206/315.11

(58) Field of Classification Search
USPC ............ 43/54.1, 55–57; 206/315.11; 224/920
See application file for complete search history.

(56) References Cited

U.S. PATENT DOCUMENTS

| | | | |
|---|---|---|---|
| 2,716,834 A * | 9/1955 | De Bonville et al. | 43/55 |
| 2,870,932 A * | 1/1959 | Davis | 43/56 |
| 3,005,671 A * | 10/1961 | Majeski | 43/54.1 |
| 3,217,444 A * | 11/1965 | Howard | 43/57 |
| 3,499,244 A * | 3/1970 | Malone | 43/56 |
| 3,751,845 A * | 8/1973 | van Leeuwen | 43/56 |
| 3,831,310 A * | 8/1974 | Frangullie | 43/56 |
| 3,958,359 A * | 5/1976 | Doughty | 43/55 |
| 4,067,607 A * | 1/1978 | Battles | 312/235.2 |
| 4,128,170 A * | 12/1978 | Elliott | 43/54.1 |
| 4,261,131 A * | 4/1981 | Poffenberger | 43/57 |
| 4,353,182 A * | 10/1982 | Junkas et al. | 43/54.1 |
| 4,462,180 A * | 7/1984 | Scott | 43/57 |
| 4,677,785 A * | 7/1987 | Lambourn | 43/57 |
| 4,757,636 A * | 7/1988 | Lambourn | 43/57 |
| 4,759,148 A * | 7/1988 | Love | 43/54.1 |
| 4,999,943 A * | 3/1991 | Crabtree | 43/54.1 |
| 5,125,183 A * | 6/1992 | Tisdell | 43/54.1 |
| 5,231,789 A * | 8/1993 | Radmanovich | 43/57 |
| 5,303,500 A * | 4/1994 | Luukonen | 43/54.1 |
| 5,305,542 A * | 4/1994 | Phelps | 43/57 |
| 5,305,544 A * | 4/1994 | Testa, Jr. | 43/57 |
| 5,319,877 A * | 6/1994 | Hagan | 43/56 |
| 5,337,892 A * | 8/1994 | Zaffina | 43/54.1 |
| 5,471,779 A * | 12/1995 | Downey | 43/54.1 |
| 5,542,206 A * | 8/1996 | Lisch | 43/54.1 |

(Continued)

FOREIGN PATENT DOCUMENTS

| | | | | |
|---|---|---|---|---|
| JP | 2001148986 A | * | 6/2001 | A01K 97/05 |
| JP | 2002186393 A | * | 7/2002 | A01K 97/05 |
| JP | 2009261376 A | * | 11/2009 | A01K 97/06 |
| WO | WO 9905907 A1 | * | 2/1999 | A01K 97/06 |

*Primary Examiner* — Darren W Ark
(74) *Attorney, Agent, or Firm* — Robert C. Montgomery; Montgomery Patent & Design

(57) ABSTRACT

A combination bait bucket and tackle box comprises a cylindrical container providing a means for dry storage of fishing supplies and also live bait. The bait container comprises a top portion of the device. The container further comprises a hinged access lid, a carrying handle, and a pair of slots adapted for securely receiving an aerator pump and a lantern. A bottom portion of the bait container lockably engages a top portion of the tackle box in order to allow the entire apparatus to be carried as unitary device. The tackle box comprises a round bottom portion of the apparatus which includes a plurality of drawers for storage of fishing supplies.

13 Claims, 4 Drawing Sheets

(56) References Cited

U.S. PATENT DOCUMENTS

| | | | |
|---|---|---|---|
| 5,634,291 A * | 6/1997 | Pham | 43/57 |
| 5,659,995 A * | 8/1997 | Hoffman | 43/54.1 |
| 5,799,787 A * | 9/1998 | Talbot | 43/54.1 |
| 5,802,760 A * | 9/1998 | Campbell | 43/57 |
| 5,813,528 A * | 9/1998 | Bliek et al. | 43/55 |
| 5,864,981 A * | 2/1999 | Zeman | 43/57 |
| 5,996,272 A * | 12/1999 | Raff | 43/54.1 |
| 6,076,298 A * | 6/2000 | Teel | 43/54.1 |
| 6,729,066 B1 * | 5/2004 | Howley | 43/57 |
| 6,783,018 B1 * | 8/2004 | Rondeau | 43/56 |
| 6,820,364 B1 * | 11/2004 | Tyson | 43/56 |
| 6,886,291 B1 * | 5/2005 | Jaggers | 43/56 |
| 7,162,831 B1 * | 1/2007 | Morton et al. | 43/57 |
| 7,389,608 B1 * | 6/2008 | MacKay | 43/57 |
| 7,644,535 B2 * | 1/2010 | Sloop | 43/56 |
| 8,434,257 B2 * | 5/2013 | Arias et al. | 43/54.1 |

\* cited by examiner

COMBINATION BAIT BUCKET AND TACKLE BOX

RELATED APPLICATIONS

The present invention was first described in and claims the benefit of U.S. Provisional Application No. 61/383,422 filed on Sep. 16, 2010, the entire disclosures of which are incorporated herein by reference.

FIELD OF THE INVENTION

The present invention relates generally to a storage unit for fishing supplies, and in particular, to a combined bait bucket and tackle box apparatus particularly adapted for use during fishing.

BACKGROUND OF THE INVENTION

Fishing is an intricate activity which encompasses many thousands of styles of equipment and strategies. The list of common equipment that is necessary to enjoy and succeed at fishing is seemingly endless. This list includes fishing poles, tackle boxes, bait boxes, chairs, hooks, rods, sinkers, bobbers, bait, lures, and the like. The long list of equipment and supplies that the fisherman has to carry sometimes creates a burden that can tend to spoil that enjoyment, calmness, and simplicity that are associated with fishing.

While a fishing tackle box provides a great means of organizing such fishing materials and supplies, depending on the user's methods and intent, a bait bucket must be carried separately. Each of these devices provides different benefits in terms of permanent storage for inanimate accessories for the tackle box versus temporary preservation of live bait in the case of the bait bucket. However, just these two (2) devices already occupy the available hands of a single fisherman and as soon as additional items such as rods and chairs are taken into account it can be seen that it can be unduly cumbersome for the fisherman to transport their equipment to a fishing spot. This is doubly true in the cases where the fisherman's point of arrival is distant from their fishing spot or when the fisherman likes to move about on a regular basis, particularly in dark conditions.

Various attempts have been made to provide storage devices for use while fishing. Examples of these attempts can be seen by reference to several U.S. patents, including U.S. Pat. No. 4,128,170; U.S. Pat. No. 5,231,789; U.S. Pat. No. 5,305,544; U.S. Pat. No. 5,634,291; U.S. Pat. No. 5,864,981; U.S. Pat. No. 6,076,298; and U.S. Pat. No. 7,389,608. However, none of these designs are similar to the present invention.

While these devices fulfill their respective, particular objectives, each of these references suffer from one (1) or more disadvantages. Many such devices do not provide a desirable range of storage and utility features advantageous for fishing activities. Many such devices are difficult to transport. Many such devices cannot be separated or adapted for accommodating specific tasks or uses without requiring undue complexity on the part of the user. Many such devices are not adapted to accommodate live bait while also providing organization to inanimate fishing accessories. Accordingly, there exists a need for a portable storage device for fishing accessories without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a fishing device that can accommodate fishing accessories and live bait while providing a range of separable, portable utilities advantageous during fishing activities. Thus, the object of the present invention is to solve the aforementioned disadvantages and provide for this need.

To achieve the above objectives, it is an object of the present invention to comprise a combined bait bucket and tackle box in a separable, unitary receptacle. The device allows a fisherman to manually transport all of the supplies needed for a successful fishing trip.

Another object of the present invention is to enable quick separation and connection of the bait bucket and tackle box via a twist-locking coupling mechanism. Both the bait bucket and tackle box comprise a generally circular perimeter shape such that the bait bucket can be locked in place atop the tackle box in order to form a continuous cylindrical unit. This enables the fisherman to transport both portions of the device together but to physically separate the bait bucket and tackle box during use for purposes of placement, convenience, ease of access, and the like. The device includes a pair of handles to facilitate manual transportation.

Yet still another object of the present invention is to comprise a range of features associated with conventional bait buckets and tackle boxes including a water reservoir within the bait bucket for storing live bait, a lid for the bait bucket, a perforated access door within the lid of the bait bucket for quickly accessing bait, and a plurality of hinged storage drawers within the tackle box for storing small fishing accessories such as bait, hooks, lures, bobbers and the like. The lid can comprise a number of attachment means to the bait bucket including a friction fit rim, a threaded perimeter, a unitary integral construction, or the like.

Yet still another object of the present invention is to provide a removable battery powered aerator for aerating the water within the water reservoir during use. The aerator is removably retained within a slot in a side wall of the bait bucket and is in fluid communication with the water reservoir via an air hose and air stone that are routed through an aperture in a top of the bait bucket.

Yet still another object of the present invention is to provide a lantern that illuminates the device during use. The lantern is battery powered and is removably retaining within a slot located in a side wall of the bait bucket opposite the aerator. The lantern can be removed when the lid is off in order to be utilized as a handheld flashlight.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY

Figure 1:
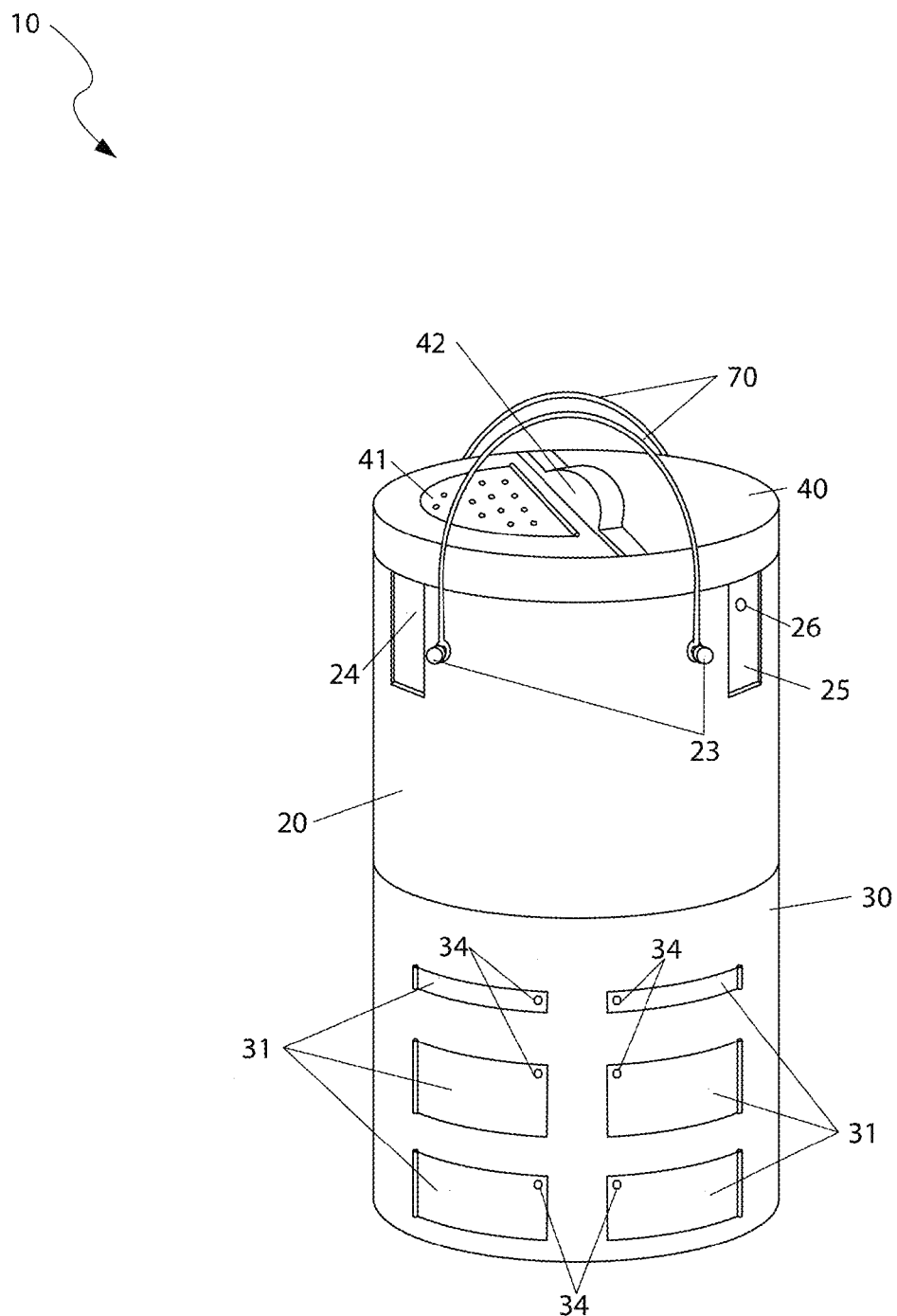
FIG. 1 is a front perspective view of a combination bait bucket and tackle box 10, according to a preferred embodiment of the present invention.

| | |
|---|---|
| 10 | combination bait bucket and tackle box |
| 15 | upper wall |
| 20 | first upper portion |
| 21 | male interlocking feature |
| 23 | post |
| 24 | lamp slot |
| 25 | aerator slot |
| 26 | hose aperture |
| 30 | lower portion |
| 31 | drawer |
| 32 | slot |
| 33 | female receiving slot |
| 34 | handle |
| 35 | locking groove |
| 40 | first top cover |
| 41 | hinged lid |
| 42 | gripping protrusion |
| 50 | lamp |
| 60 | aerator |
| 70 | handle |
| 120 | second upper portion |
| 140 | second top cover |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a combination bait bucket and tackle box (herein described as the "device") 10, which provides a means by which fishing supplies, materials, and bait, can be stored, transported, and used in a functional manner. The use of the device 10 allows fishermen to carry all supplies needed for a successful fishing trip in a manner which is quick, easy, and effective.

The device 10 combines the functionality of a bait bucket and a tackle box into a unitary receptacle. The device 10 generally includes a cylindrical container approximately ten (10) inches in diameter and twelve (12) inches tall. The device 10 includes first upper section 20 and a lower portion 30 being removably attached to each other, each having generally cylindrical shapes.

Figure 2:
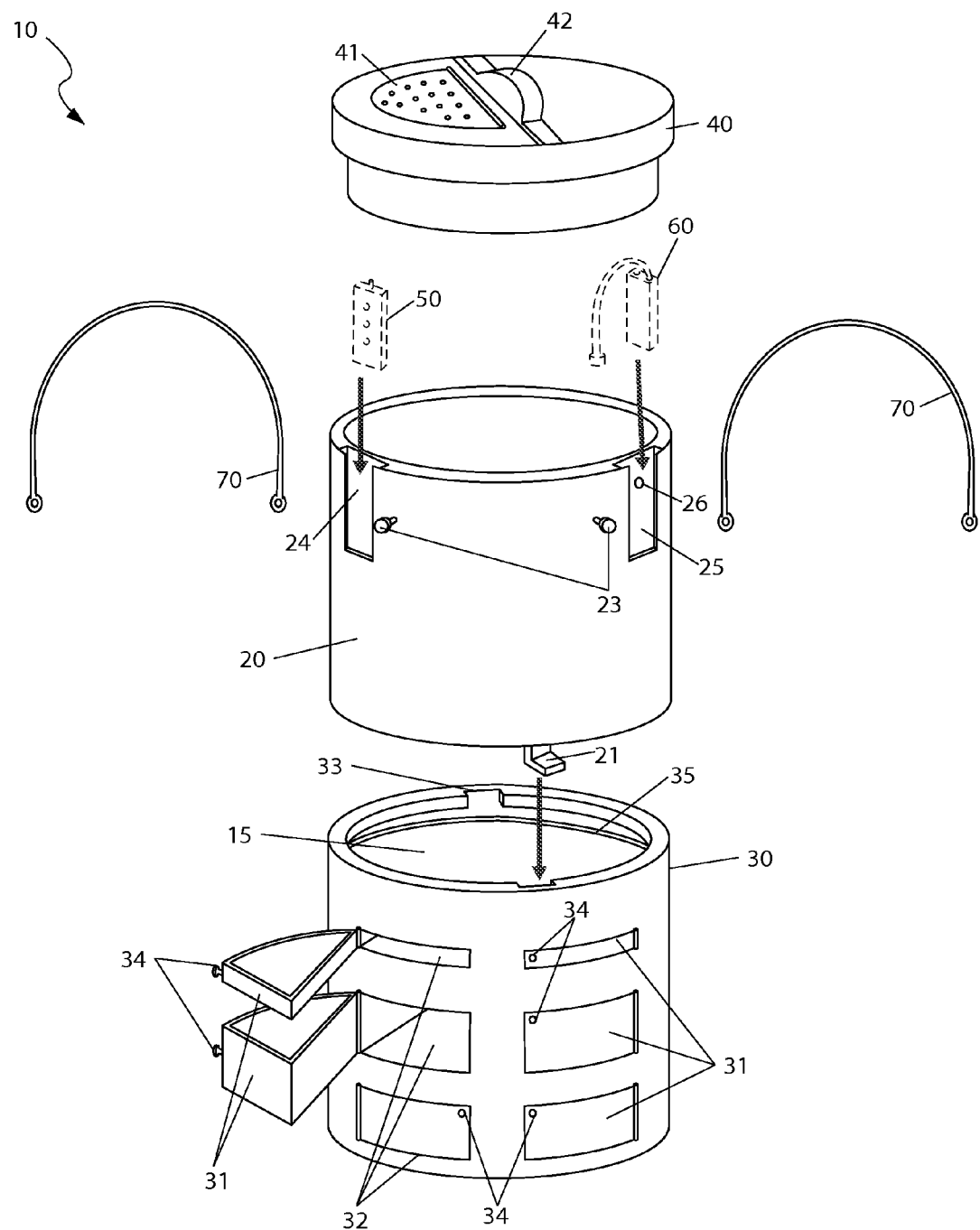
FIG. 2 is an exploded view of the combination bait bucket and tackle box 10, according to a preferred embodiment of the present invention.

Referring now to FIGS. 1 and 2, perspective and exploded views of the combination bait bucket and tackle box 10, according to a preferred embodiment of the present invention, are disclosed. The first upper portion 20 of the device 10 provides a bait container function having a first top cover 40 further comprising a hingedly attached lid 41 mounted to said first top cover 40. The first upper portion 20 provides a hollow internal reservoir for the storage of water, bait fish, or other fresh bait. In the preferred embodiment the cylindrical sidewall of the first upper portion 20 is made of a thermally insulating material. The first top cover 40 comprises a stepped perimeter profile to provide a snug friction fit into the first upper portion 20. The hinged lid 41 is preferably a semi-circular door hingedly mounted to the first top cover 40 to provide access to the internal reservoir. The hinged lid 41 also includes a plurality of apertures to allow air to freely pass into and out from the internal reservoir. The first top cover 40 also includes a gripping protrusion 42 extending across a central axis which provides a user a gripping interface for removal of the first top cover 40.

A lower portion 30 of the device 10 provides a cylindrical tackle box function having an upper wall 15 spanning a diameter of said first sidewall subjacent from an upper end of said first sidewall providing access to a lower portion interior. The lower portion also has a plurality of swing out drawers 31 which may contain various fishing equipment such as, but not limited to: hooks, bait, sinkers, bobbers, or similar fishing related bait and tackle items. The lower portion 30 also provides a hollow interior to contain the swing out drawers 31 when in a stored stated. The lower portion 30 also includes a plurality of generally wedge-shaped slots 32 correspondingly sized to slidably receive respective drawer portions 31. Each drawer 31 includes a generally wedge-shaped storage member having a flat bottom and three upwardly extending sidewalls. Each drawer 31 is hingedly attached to the lower portion 30 at one (1) end being adjacent to the corresponding slot 32, thereby allowing the drawer 31 to slide in and out from the corresponding slot 32. Each drawer 31 also includes a small pull handle 34 at an end portion opposite the hinge for the user to engage when pulling out and returning the drawer 31. The sidewall defined between the hinge and the pull handle 34 has an arcuate shape to correspond to the outer shape of the cylindrical lower portion 30 when the drawer 31 is in the stored state. The shape of the drawers 31 are adapted to swing out from the respective slot 32 without any interference between the two (2) structures 31, 32.

The first upper 20 and lower 30 portions are removably connected to each other via a pair of opposed twist-locking male interlocking features 21 which extend downwardly from a bottom side of the first upper portion 20. Said male interlocking features 21 comprise "L"-shaped male interlocking features 21 which engage a matching female receiving slot portion 33 along a top perimeter edge of the lower portion 30. Said male interlocking features 21 slide downwardly within said female receiving slots 33 and in turn enter a subjacent locking groove 35 comprising an annular inner groove around an upper edge portion of the lower portion 30. The male interlocking features 21 are inserted into the corresponding female receiving slots 33 and subsequently twisted within the locking groove 35 to securely retain the first upper 20 and lower 30 portions together.

The first upper portion 20 comprises a lamp slot 24 and an aerator slot 25 along an upper perimeter edge for convenient storage and transport of purchased lamp 50 and aerator 60 devices. The lamp 50 removably attaches to the lamp slot 24 being particularly sized to receive said lamp 50 within. In like manner, the aerator 60 removably attaches to the aerator slot 25 being particularly sized to receive said aerator 60 within. The lamp 50 is envisioned to be a commercially-available battery-operated portable LED light for providing illumination during periods of low ambient light. The aerator 60 is envisioned to comprise a commercially-available compact water resistant battery-operated unit comprising an aerator pump, a length of hose, and an air stone. The hose and air stone portions are envisioned to be routed through a wall portion of the first upper portion 20 and submerged into contained water through a hose aperture portion 26 located within the aerator slot 25 for aeration of the water stored within the upper portion reservoir.

The device 10 also includes a pair of handles 70 which are removably coupled to the first upper portion 20 via looping strap members to allow for easy transportation of the device. The handles 70 are preferably lengths of rope, braided nylon cord, or similar light-weight and durable cord material. In the preferred embodiment the handles include a loop at each opposing end which removably attached to a plurality of respective integral post portions 23 located along an upper outer surface of the first upper portion 20.

Figure 3:
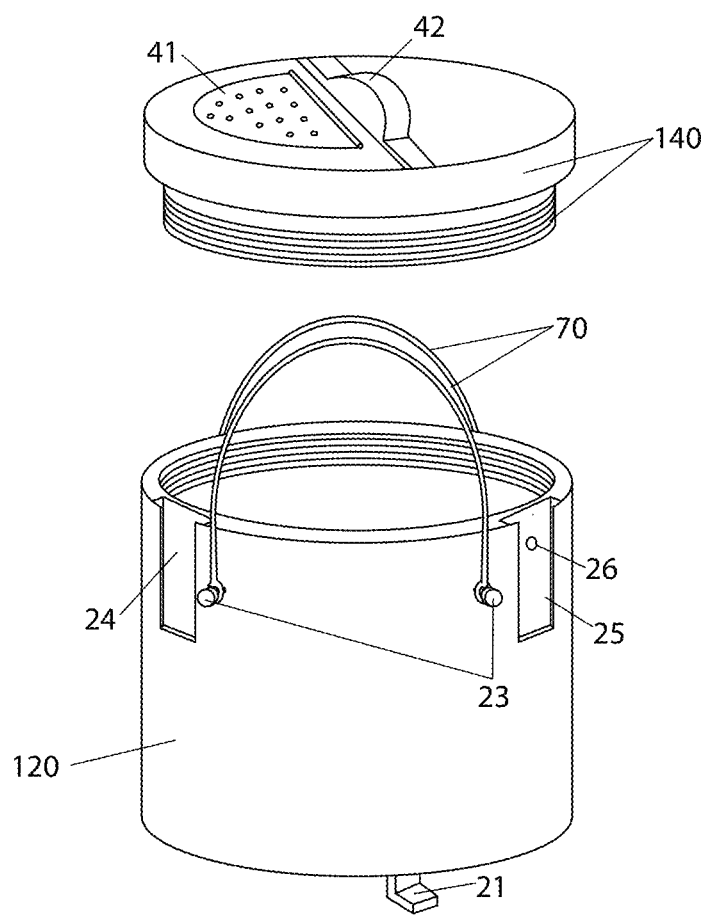
FIG. 3 is a front perspective view of the combination bait bucket and tackle box 10 depicting a threaded top cover 140, according to an alternate embodiment of the present invention; and, FIG. 4 is a front perspective view of the combination bait bucket and tackle box 10 depicting a second upper portion 120, according to an alternate embodiment of the present invention.

Referring now to FIG. 3, a front perspective view of the device 10 depicting a threaded top cover 140, according to an alternate embodiment of the present invention, is disclosed. The invention may be provided with an alternate threaded top cover 140 and a corresponding threaded second upper portion 120.

Figure 4:
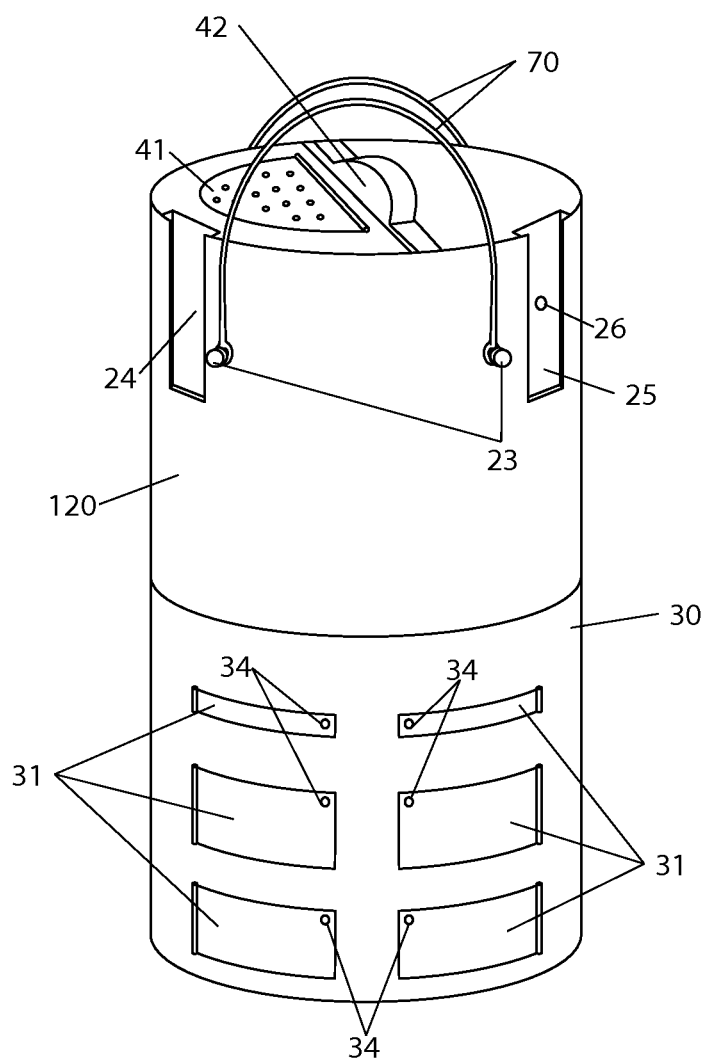

Referring now to FIG. 4, a front perspective view of the device 10 depicting a second upper portion 120, according to an alternate embodiment of the present invention, is disclosed. The invention may be provided with a second upper portion 120 comprising a top cover portion being integrated into sidewall portions.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A combination bait bucket and tackle box, comprising:
   a lower portion, further comprising a generally cylindrical body member having a first lower wall, a first sidewall, and an upper wall spanning a diameter of said first sidewall subjacent from an upper end of said first sidewall providing access to a lower portion interior;
   a plurality of drawers each hingedly attached to said first sidewall;
   an upper portion, further comprising a generally cylindrical body member having a second lower wall, a second sidewall, and an upper opening providing access to an upper portion interior;
   an attachment means for removably attaching said upper portion to said lower portion;
   a lid removably attached to an upper end of said upper portion;
   a pair of slots located on said second sidewall;
   wherein when said lid is attached to said upper portion and said upper portion is attached to said lower portion, said combination bait bucket and tackle box comprises a coterminous and continuous cylindrical assembly;
   wherein said plurality of drawers, when in a closed position, each is coterminous with an outer diameter of said first sidewall;
   wherein one of said pair of slots is adapted to receive and secure an aerator therein, such that said aerator is in fluid communication with said upper portion interior; and,
   wherein a second one of said pair of slots is adapted to receive and secure an illumination device therein.

2. The combination bait bucket and tackle box of claim 1, wherein said lid is attachable to said upper portion via a friction fit connection.

3. The combination bait bucket and tackle box of claim 2, wherein said plurality of drawers each further comprises a wedge shaped drawer hingedly connected at a first side to said first sidewall and having an opening means located at an outer surface of a second side.

4. The combination bait bucket and tackle box of claim 3, wherein said attachment means further comprise a twist-locking coupling mechanism, further comprising:
   at least one interlocking feature located on a bottom perimeter edge of said upper portion; and,
   a receiving feature comprising at least one receiving slot located on an upper perimeter edge of said lower portion and an annular locking groove located on an inner portion of said first sidewall subjacent to said at least one receiving slot;
   wherein a corresponding receiving slot receives a corresponding interlocking feature and is retained within said groove; and,
   wherein said upper wall is located lower of said annular groove.

5. The combination bait bucket and tackle box of claim 4, further comprising a pair of handles each removably attachable to a pair of posts outwardly extending from an outer surface of said second sidewall.

6. The combination bait bucket and tackle box of claim 5, wherein each of said pair of slots further comprises a receiving portion depending downward from an upper perimeter edge of said upper portion having an opening coextensive with a length of said slot, said length terminating at a horizontal shelf.

7. The combination bait bucket and tackle box of claim 6, wherein said one of said pair of slots further comprises an aperture through said second sidewall in fluid communication with said upper portion interior.

8. The combination bait bucket and tackle box of claim 7, wherein said lid further comprises a perforated access door and a centrally located lid handle.

9. A combination bait bucket and tackle box, comprising:
   a lower portion, further comprising a generally cylindrical body member having a first lower wall, a first sidewall, and an upper wall spanning a diameter of said first sidewall subjacent from an upper end of said first sidewall providing access to a lower portion interior;

a plurality of drawers each hingedly attached to said first sidewall;

an upper portion, further comprising a generally cylindrical body member having a second lower wall, a second sidewall, and a top providing access to an upper portion interior;

an attachment means for removably attaching said upper portion to said lower portion;

a pair of slots located on said second sidewall; and, a pair of handles each removably attachable to a pair of posts outwardly extending from an outer surface of said second sidewall;

wherein when said upper portion is attached to said lower portion, said combination bait bucket and tackle box comprises a coterminous and continuous cylindrical assembly;

wherein said plurality of drawers, when in a closed position, each is coterminous with an outer diameter of said first sidewall;

wherein said top comprises a planar wall with a centrally located top handle and further having a perforated access door providing access to said upper portion interior;

wherein one of said pair of slots is adapted to receive and secure an aerator therein wherein one of said pair of slots is adapted to receive and secure an aerator therein, such that said aerator is in fluid communication with said upper portion interior; and, wherein a second one of said pair of slots is adapted to receive and secure an illumination device therein.

10. The combination bait bucket and tackle box of claim 9, wherein said plurality of drawers each further comprises a wedge shaped drawer, hingedly connected at a first side to said first sidewall and having an opening means located at an outer surface of a second side.

11. The combination bait bucket and tackle box of claim 10, wherein said attachment means further comprise a twist-locking coupling mechanism, further comprising:

at least one interlocking feature located on a bottom perimeter edge of said upper portion; and, a receiving feature comprising at least one receiving slot located on an upper perimeter edge of said lower portion and an annular locking groove located on an inner portion of said first sidewall subjacent to said at least one receiving slot;

wherein a corresponding receiving slot receives a corresponding interlocking feature and is retained within said groove; and, wherein said upper wall is located lower of said annular groove.

12. The combination bait bucket and tackle box of claim 11, wherein each of said pair of slots further comprises a receiving portion depending downward from an upper perimeter edge of said upper portion having an opening coextensive with a length of said slot, said length terminating at a horizontal shelf.

13. The combination bait bucket and tackle box of claim 12, wherein said one of said pair of slots further comprises an aperture through said second sidewall in fluid communication with said upper portion interior.

* * * * *